US009039027B2

(12) United States Patent
Marais et al.

(10) Patent No.: US 9,039,027 B2
(45) Date of Patent: May 26, 2015

(54) FOLDABLE BICYCLE

(75) Inventors: Tony Marais, Lille (FR); Benjamin Poullet, Cysoing (FR); Pierre-Louis Bassetti, Meignies (FR); Fabien Frohlicher, Loos (FR)

(73) Assignee: DECATHLON, Villeneuve d'Ascq (FR)

( * ) Notice: Subject to any disclaimer, the term of this patent is extended or adjusted under 35 U.S.C. 154(b) by 372 days.

(21) Appl. No.: 13/339,567

(22) Filed: Dec. 29, 2011

(65) Prior Publication Data
US 2012/0169029 A1 Jul. 5, 2012

(30) Foreign Application Priority Data

Dec. 31, 2010 (FR) ...................................... 10 61402

(51) Int. Cl.
*B62K 3/02* (2006.01)
*B62K 15/00* (2006.01)
(52) U.S. Cl.
CPC ................ *B62K 3/02* (2013.01); *B62K 15/006* (2013.01)
(58) Field of Classification Search
CPC .... B62K 15/00; B62K 15/006; B62K 15/008; B62K 2015/00; B62K 2015/01
USPC ...................... 280/287, 278, 87.05
See application file for complete search history.

(56) References Cited

U.S. PATENT DOCUMENTS

| | | | | |
|---|---|---|---|---|
| 1,584,568 A * | 5/1926 | Haskell | ......................... | 280/278 |
| 2,372,024 A * | 3/1945 | Schwinn | ....................... | 280/287 |
| 2,777,711 A * | 1/1957 | Norishige | ..................... | 280/287 |
| 4,113,271 A * | 9/1978 | Furia | ............................. | 280/287 |
| 4,132,428 A * | 1/1979 | Lassiere | ........................ | 280/278 |
| 4,219,209 A * | 8/1980 | Haack | ............................ | 280/278 |
| 4,579,360 A * | 4/1986 | Nishimura et al. | ........... | 280/278 |
| 5,975,551 A * | 11/1999 | Montague et al. | ............ | 280/287 |
| 6,267,401 B1 * | 7/2001 | De Jong | ........................ | 280/287 |
| 6,450,519 B1 * | 9/2002 | Wang | ............................ | 280/266 |
| 7,243,936 B2 * | 7/2007 | Huang | ........................... | 280/278 |
| 7,264,257 B2 * | 9/2007 | Sanders | ........................ | 280/278 |
| 7,591,473 B2 * | 9/2009 | Tak-Wei Hon et al. | ........ | 280/278 |
| 7,828,312 B1 * | 11/2010 | Yeh | ............................... | 280/278 |

(Continued)

FOREIGN PATENT DOCUMENTS

| | | |
|---|---|---|
| EP | 0996565 B1 | 5/2000 |
| EP | 2077222 A | 7/2009 |
| WO | 99/05021 A1 | 2/1999 |

OTHER PUBLICATIONS

French Patent Office, French Preliminary Search Report in application No. 10 61402, dated Jun. 17, 2011.

*Primary Examiner* — Anne Marie Boehler
*Assistant Examiner* — Maurice Williams
(74) *Attorney, Agent, or Firm* — Kenyon & Kenyon LLP

(57) ABSTRACT

A foldable bicycle comprises a frame having a rear portion supporting a rear wheel about a rear axis of rotation, a front portion supporting a front wheel about a front axis of rotation and a hinge system. The hinge system comprises a first part arranged on the rear portion and provided with a first plane surface, and a second part arranged on the front portion and provided with a second plane surface. Inside the first and second parts an actuator mechanism is arranged for actuating a stud that locks or unlocks said parts. The first plane surface and the second plane surface are disposed in a plane that is slightly inclined relative to a horizontal plane, said inclined plane being configured to facilitate pivoting of the front portion relative to the rear portion towards a folded position, in which the rear and front axes of rotation are in alignment.

19 Claims, 4 Drawing Sheets

(56) References Cited

U.S. PATENT DOCUMENTS

| | | | |
|---|---|---|---|
| 8,388,005 B2* | 3/2013 | Kim et al. | 280/287 |
| 2002/0067020 A1 | 6/2002 | Wang | |
| 2002/0167151 A1 | 11/2002 | Tseng | |
| 2003/0000754 A1* | 1/2003 | Daudt | 180/220 |
| 2003/0127825 A1* | 7/2003 | Chen | 280/287 |
| 2003/0234509 A1* | 12/2003 | Chen et al. | 280/278 |
| 2006/0175797 A1* | 8/2006 | Sanders | 280/287 |
| 2007/0205577 A1* | 9/2007 | Lau | 280/287 |
| 2007/0210556 A1* | 9/2007 | Hon et al. | 280/287 |
| 2008/0085798 A1* | 4/2008 | Miller et al. | 474/78 |
| 2008/0224441 A1* | 9/2008 | Lu | 280/278 |
| 2009/0058038 A1 | 3/2009 | Dodman et al. | |
| 2010/0230927 A1* | 9/2010 | Huang | 280/278 |
| 2010/0283221 A1* | 11/2010 | Yeh | 280/287 |
| 2011/0305502 A1* | 12/2011 | Lo | 403/84 |
| 2012/0043148 A1* | 2/2012 | Brady et al. | 180/206.5 |

* cited by examiner

FOLDABLE BICYCLE

CROSS-REFERENCE TO RELATED APPLICATIONS

This application claims priority to French application No. 10-61402, filed Dec. 31, 2010, which is incorporated herein by reference in its entirety.

The present invention relates to a foldable bicycle, the purpose of folding the bicycle being to make it more compact while it is being stored or while it is being transported, e.g. in a train, a bus, or a car. The invention relates more particularly to a folding system implemented on the bicycle.

BACKGROUND OF THE INVENTION

Foldable bicycles are known to the person skilled in the art of bicycles. Such a bicycle is composed, in particular, of a frame that is made up of a rear portion supporting a rear wheel, and of a front portion supporting a front wheel. In addition, a hinge system is implemented between the rear portion and the front portion so that said front portion can be folded back against said rear portion when the bicycle is in a folded mode. Thus, the bicycle can be disposed in a folded position making the bicycle more compact or in an unfolded position making it possible to use the bicycle. Such foldable bicycles are known, for example, from Documents EP 2 077 222 and EP 0 996 565. In those two documents EP 2 077 222 and EP 0 996 565, the hinge system that is used is provided with locking means enabling the hinge system to be locked in position once the bicycle is unfolded, i.e. once the front portion of the frame extends in forward alignment with the rear portion of said frame, in the in-use position. In Document EP 2 077 222, the locking means consist of a screw-fastening system that locks the front portion in position relative to the rear portion. In Patent Document EP 0 996 565, the locking means consist of a pin that prevents a saddle tube from pivoting, thereby preventing the hinge system from being actuated. A drawback with the hinge systems described in those documents EP 2 077 222 and EP 0 996 565 is that their design makes it difficult for the bicycle to go from the folded position to the unfolded position, and vice versa. Such hinge systems are, in particular, designed to enable the bicycle to be folded for relatively long periods of time. Another drawback suffered by the hinge systems described in those documents EP 2 077 222 and EP 0 996 565 is that they lock the front portion and the rear portion of the bicycle frame relative to each other only in the unfolded position, in order to enable the bicycle to be used.

OBJECT AND BRIEF SUMMARY OF THE INVENTION

An object of the present invention is to mitigate those drawbacks. For this purpose, it implements a hinge system of design making it simple to unlock so that the bicycle can go quickly into the folded position or into the unfolded position. This offers the advantage of enabling the bicycle to be folded both for stowing it away for relatively long periods, and also merely for making it more compact while it is being used, in particular while the user is using the bicycle in alternation with public transport modes such as train or bus.

To this end, the present invention provides a foldable bicycle comprising, in particular, a frame made up of a rear portion, of a front portion, and of a hinge system arranged between the rear portion and the front portion so as to position the bicycle either in an unfolded position in which the front portion extends forwards and in alignment with the rear portion, or in a folded position in which the front portion is folded back against the rear portion.

According to the invention, the hinge system comprises a first part arranged on the rear portion and provided with a first plane surface, a second part arranged on the front portion and provided with a second plane surface that is in abutment in direct or indirect manner against the first plane surface, a pivot coupling arranged between the first part and the second part about a pivot axis that extends perpendicularly to said first and second plane surfaces, substantially vertically. In addition, the hinge system further comprises at least one stud, slide means arranged between the stud and one of the first and second parts so as to slide the stud either into a projecting position in which it projects from the first or the second plane surface or into a retracted position in which it is retracted inside said first or second parts, and actuator means for actuating said at least one stud, which means are configured to slide said stud either into the projecting position or into the retracted position. In addition, the hinge system further comprises at least one orifice configured on the other of the first and second parts to open out in the first or the second plane surface and to receive said at least one stud in its projecting position at least when the bicycle is in its unfolded position. Preferably, the hinge system further comprises two orifices opening out in the other of said first and second plane surfaces for the purpose of receiving at least one stud in its projecting position when the bicycle is in its unfolded position and in its folded position, thereby locking the bicycle in position both in folded mode and in unfolded mode.

Preferably, the first part is provided with at least one bore opening out in the first plane surface and extending along an axis that is substantially parallel to the pivot axis between the two plane surfaces. Said bore slidably receives said at least one stud.

Preferably, a spring is arranged inside the bore and is configured to exert thrust on the stud and to slide said stud into its projecting position. In addition, a traction system is configured to pull on the stud and to slide said stud into its retracted position. It can thus be understood that when the spring is in the rest position, the stud is in the projecting position and locks the hinge system, whereas when fraction is exerted on the stud and when said stud is retracted, the hinge system is unlocked, thereby making it possible to go from the unfolded position to the folded position, or vice versa.

Preferably, the traction system comprises a traction cable and an operating handle making it possible to actuate the traction cable so as to pull the stud into the retracted position.

Preferably, the foldable bicycle further comprises a saddle, the operating handle being offset under the saddle. This offers the advantage of making it possible to act on the hinge system while concomitantly manipulating the rear portion of the bicycle with one hand and thus, with the other hand, folding or unfolding the front portion of the frame relative to the rear portion.

In the foldable bicycle of the invention, the second part is provided with two orifices opening out in the second plane surface for the purpose of receiving a stud in the projecting position. The first orifice is configured to receive the stud when the bicycle is in the unfolded position, and the second orifice is configured to receive said stud when the bicycle is in the folded position. Thus, the bicycle is locked both in the folded position and in the unfolded position.

In the foldable bicycle of the invention, in its first plane surface, the first part is provided with a circular groove in which a spring is arranged that has a first end secured to said first part and a second end secured to the second part. This spring is configured to cause the front portion to pivot automatically relative to the rear portion so as to bring the at least one stud out of alignment with the at least one orifice when said stud is in the retracted position. This offers the advantage of preventing the stud from re-positioning itself in said at least one orifice when action ceases to be taken on the traction system. This also makes it possible to break the alignment between the front portion and the rear portion of the frame when said frame is initially in the unfolded position, i.e. when the front portion is disposed in the same plane as the rear portion. Thus, after acting on the traction system, the user can let go of said fraction system and manipulate the rear portion and the front portion of the frame easily by using both hands, without it being necessary for the alignment to be broken first, e.g. by using the knee, in order to incline the front portion of the frame relative to the rear portion thereof.

The foldable bicycle of the invention further comprises a lug that extends downwards relative to the second plane surface, this lug being disposed in the circular groove. This lug is configured to come into abutment against an edge of the circular groove so as to prevent the front portion from pivoting relative to the rear portion in the direction opposite from the folding direction in which said bicycle is folded, when the front portion of the frame is disposed in the same plane as the rear portion of the frame, when the bicycle is in the unfolded position. It is thus possible to guarantee that the bicycle can be folded in one direction only.

Preferably, the second end of the spring is secured to this lug.

In the foldable bicycle of the invention, the rear portion supports a rear wheel about a rear axis of rotation and the front portion supports a front wheel about a front axis of rotation. In addition, the first plane surface and the second plane surface are disposed in a plane that is slightly inclined relative to a horizontal plane, said inclined plane being configured to facilitate pivoting of the front portion relative to the rear portion towards a folded position of the bicycle, in which position the rear and front axes of rotation of the wheels are in alignment. This offers the advantage of making it possible to push or to pull the bicycle into its folded position in which its rear and front wheels are disposed with their axes coinciding, and of procuring contact with the ground or floor that is stable.

In the foldable bicycle of the invention, a friction disk is arranged between the first plane surface and the second plane surface, the friction disk being secured to the plane surface in which the at least one orifice opens out. The friction disk is provided with as many orifices as said plane surface has, and with the orifices in the disk being arranged identically to the orifices in said plane surface, so as to enable said at least one stud to pass through when in its projecting position. Said friction disk offers the advantage of avoiding direct contact between the first plane surface and the second plane surface, thereby limiting wear on them.

In the foldable bicycle of the invention, the pivot coupling is configured to constitute a duct that extends along the pivot axis and both through the first part and also through the second part, said duct being configured to pass cables between the front portion and the rear portion of the frame of the bicycle, in particular gear cables, brake cables, and lighting cables.

Preferably, the pivot coupling is constituted at least by one tubular segment that is arranged on the first part and that extends perpendicularly upwards relative to the first plane surface, by a bore arranged in the second part perpendicularly to the second plane surface for the purpose of receiving the tubular segment, by a rolling bearing arranged between the tubular segment and the bore, and by stop means arranged between the tubular segment and the second part for the purpose of preventing the bore in the second part from moving in translation along the pivot axis relative to the tubular segment on the first part.

According to the invention, the stud has a conical head and the at least one orifice includes a conical bore segment configured to receive the conical head. This offers the advantage of avoiding assembly clearance in the hinge system between the first part on the rear portion and the second part on the front portion, in particular when the bicycle is in the unfolded position or is being used.

BRIEF DESCRIPTION OF THE DRAWINGS

Other characteristics and advantages of the present invention appear on reading the following description of a preferred design embodiment of the foldable bicycle of the invention, given with reference to the accompanying drawings, in which.

MORE DETAILED DESCRIPTION

Figure 1:
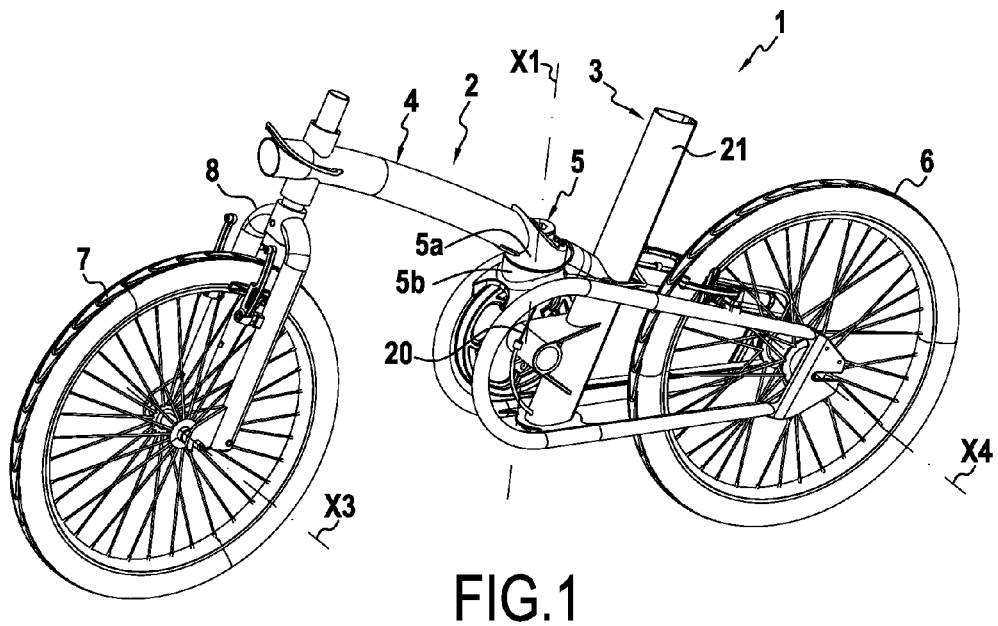
FIG. 1 shows a foldable bicycle frame in the in-use unfolded position.
Figure 2:
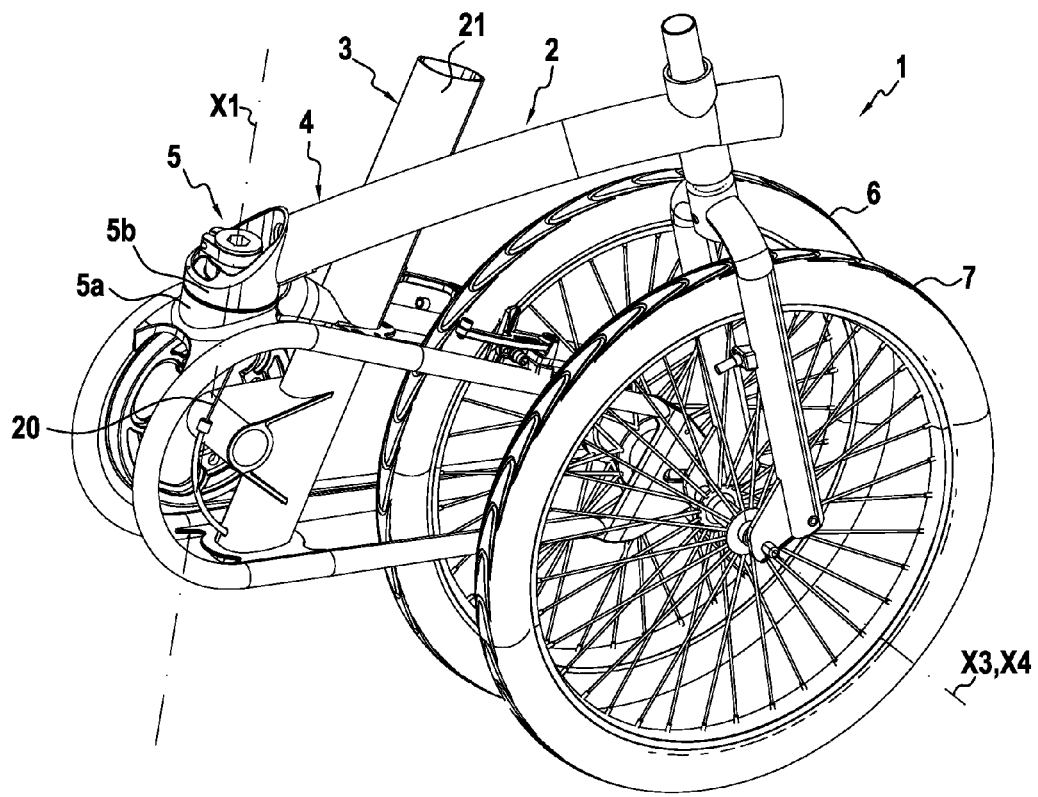
FIG. 2 shows the bicycle frame shown in FIG. 1 in its stowage folded position.

FIG. 1 shows a bicycle 1 and in particular the frame 2 of the bicycle. Said frame 2 has a rear portion 3 and a front portion 4 that are hinged together by means of a hinge system 5 configured to allow the rear portion 3 and the front portion 4 to pivot relative to each other about a pivot axis X1, so as to enable the bicycle to be positioned in an unfolded position as shown in FIG. 1, in which position the front portion 4 is disposed in alignment with the rear portion 3 or, conversely, in a folded position as shown in FIG. 2, in which position the front portion 4 is folded back against the rear portion 3. FIGS. 1 and 2 also show the presence of a rear wheel 6 mounted to move in rotation on the rear portion 3 of the frame 2 and the presence of a front wheel 7 mounted to move in rotation on a fork 8 assembled to the front portion 4 of the frame 2.

As shown in FIGS. 3 to 6, the hinge system 5 comprises a first part 5a provided with a first plane surface 9 and arranged on the rear portion 3 of the frame 2, and a second part 5b provided with a second plane surface 10 and arranged on the front portion 4 of the frame 2. Said first part 5a and said second part 5b are coupled together to pivot relative to each other about a pivot axis X1. An open-ended bore 11 and a groove 12 can be seen in the first plane surface 9, as shown, in particular, in FIGS. 3, 5, and 6. A spring 13 is received in said bore 11. In addition, this bore 11 slidably receives a stud 14 capable of sliding along a longitudinal axis X2 of the bore. It can be seen from the figures that the pivot axis X1 is perpendicular to the first and second plane surfaces 9, 10. Similarly, the longitudinal axis X2 is disposed parallel to the pivot axis X1. However, it is possible to make provision for the axis X2 to be inclined slightly relative to the axis X1.

Figure 3:
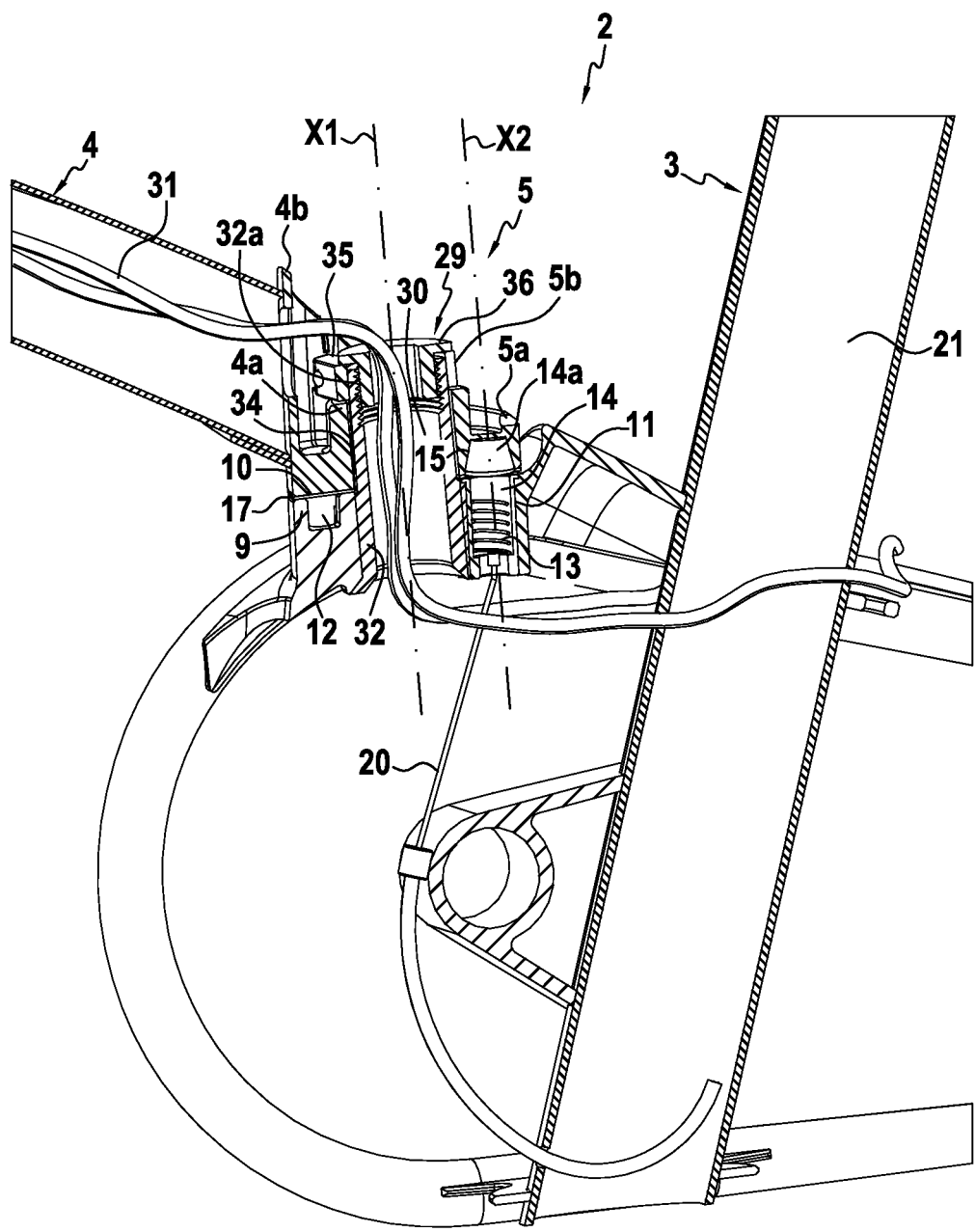
FIG. 3 shows the hinge system arranged between the front portion and the rear portion of the frame of the bicycle.

Said stud 14 is capable of sliding inside the bore 11 from a projecting position to a retracted position, and vice versa. In the projecting position, as shown in FIG. 3, the stud 14 stands proud of the first plane surface 9. Conversely, in the retracted position, said stud 14 is disposed below the first plane surface 9, inside the first part 5a.

Figure 4:
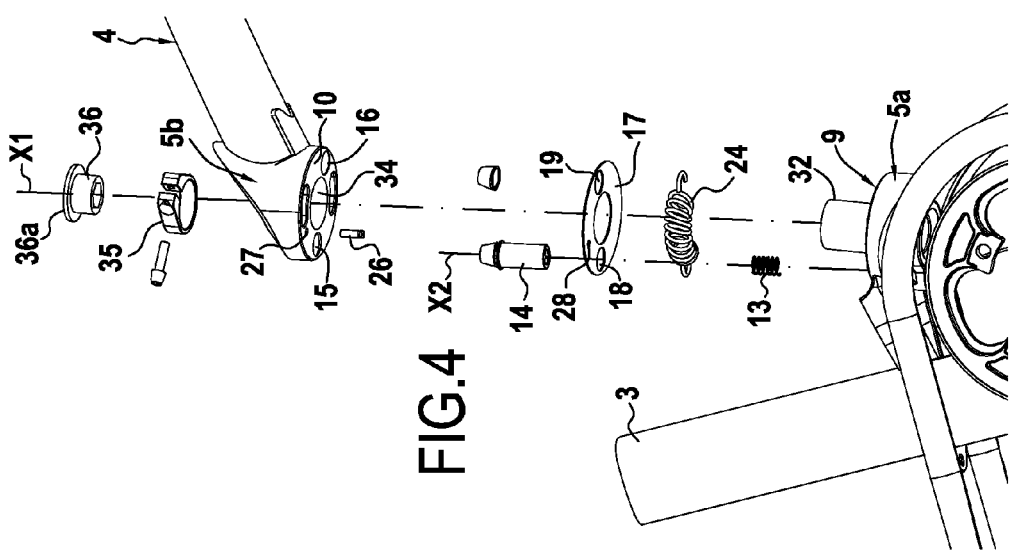

As shown in FIG. 4, the second part 5b is provided with two orifices 15, 16 that open out in the second plane surface 10 and that are configured to receive the head 14a of the stud 14 as shown in FIG. 3. When the head 14a of the stud 14 is disposed in the first orifice 15, the front portion 4 of the frame 2 is disposed in forward alignment with the rear portion 4 of the frame 2, as shown in particular in FIG. 1. Conversely, when the front portion 4 is pivoted relative to the rear portion 3 and when the front wheel 7 is folded back against the rear wheel 6, as shown in FIG. 2, the head 14a of the stud 14 is disposed in the second orifice 16.

The first plane surface 9 could be in direct contact with the second plane surface 10 of the front portion 4. However, in order to limit the friction between these two plane surfaces 9 and 10, a friction disk 17 is positioned between the first plane surface 9 and the second plane surface 10. This friction disk 17 is constrained in rotation about the pivot axis X1 relative to the second plane surface 10 so as to pivot with said second plane surface while the front portion 4 of the frame 2 is being folded back against the rear portion 3 of the frame 2 or, conversely, while said front portion is being deployed into forward alignment with said rear portion 3 of the frame 2.

For this purpose, the friction disk 17 is also provided with a first orifice 18 that is in register with the first orifice 15 opening out in the second plane surface 10, and said friction disk 17 is also provided with a second orifice 19 that is in register with the second orifice 16 opening out in the second plane surface 10, so as to enable the head 14a of the stud 14 to pass through.

In FIG. 3, it can be seen that the head 14a of the stud 14 is of conical shape, and that the first orifice 15 is also of conical shape. Provision is also made for the second orifice 16 in the second plane surface 10 to have this conical shape. This offers the advantage of locking the first part 5a on the rear portion 3 appropriately relative to the second part 5b on the front portion 4 about the pivot axis X1, without any risk of slack occurring in the pivot coupling while it is locked.

The spring 13 acts on the stud so as to hold it in a normal position in which it projects relative to the first surface 9. Thus, when the stud 14 coincides with the first orifice 15 or with the second orifice 16 in the second plane surface 10, said stud systematically penetrates into one or other of said orifices 15, 16 so as to lock the front portion 4 and the rear portion 3 of the frame 2 relative to each other in the folded position or in the unfolded position.

Figure 7:
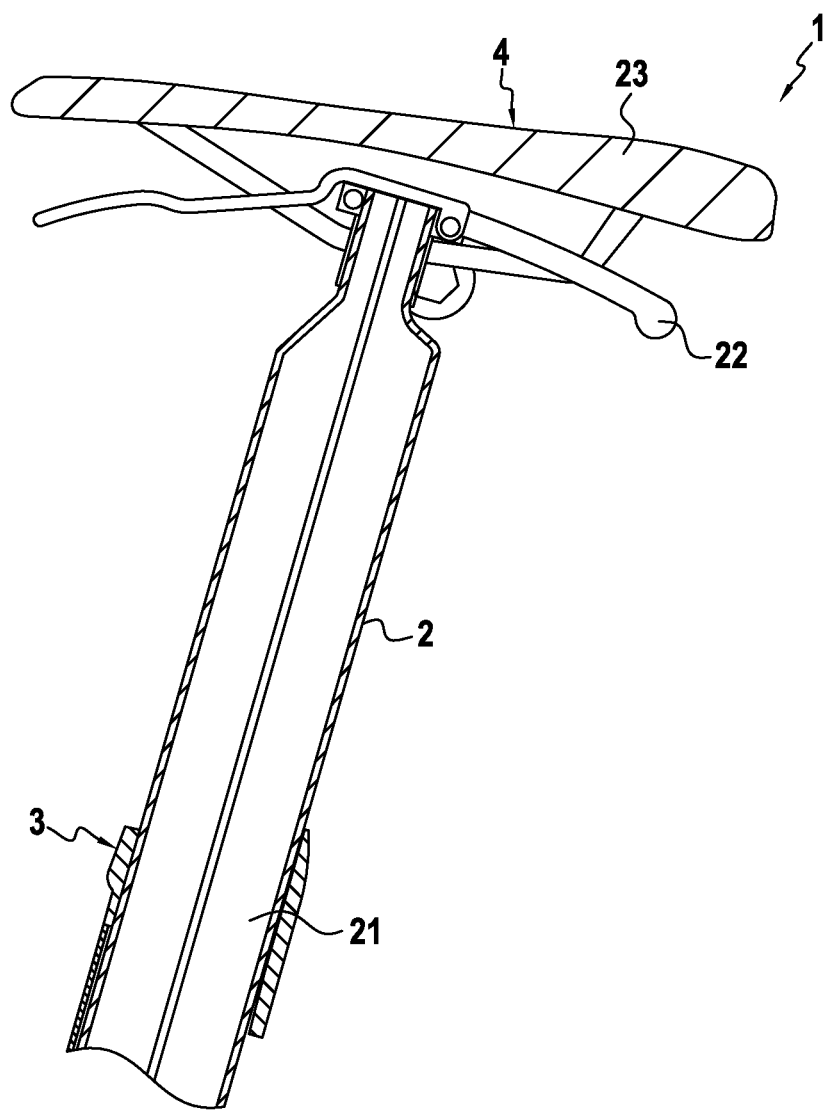
FIG. 7 shows a handle for operating the hinge system that is arranged on the bicycle of the invention.

The head 14a of the stud is removed from the first orifice 15 or from the second orifice 16 in the second part 5b by retracting the stud 14 below the first plane surface 9, inside the first part 5a. For this purpose, the stud 14 is actuated by means of a traction cable 20 shown, in particular, in FIGS. 1 to 3. It can be seen in FIGS. 1 to 3 that the cable 20 penetrates into the saddle tube 21. This cable 20 is preferably actuated by means of an operating handle 22 arranged under the saddle 23 of the bicycle 1, as shown in FIG. 7.

Figure 5:
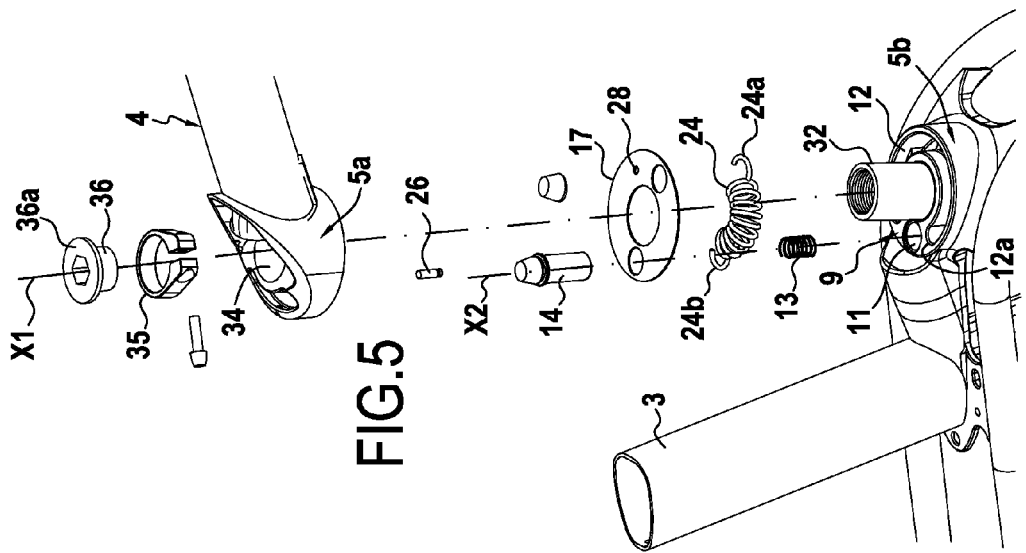
FIGS. 4 and 5 are exploded views of the hinge system seen looking from two different angles.
Figure 6:
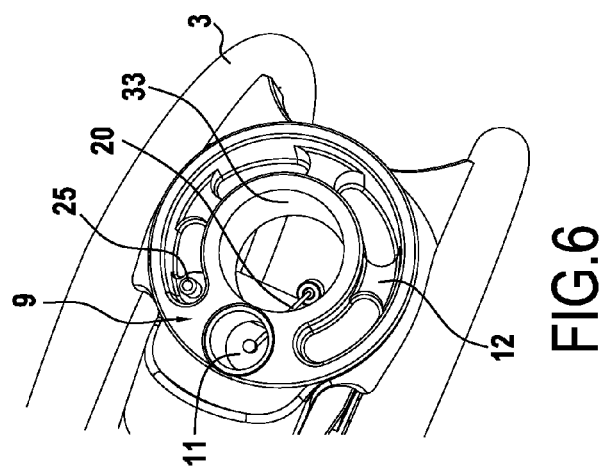
FIG. 6 is a view from above of a portion of the hinge system that is arranged on the rear portion of the bicycle frame.

The groove 12 is of circular shape and makes it possible to receive a spring 24 shown in FIGS. 4 and 5. This spring 24 has its first end 24a fastened to a lug 25 arranged inside the groove 12 in the first part 5a, as shown in FIG. 6. In addition, the second end 24b of the spring 24 is assembled to a lug 26 that is fitted into an orifice 27 arranged in the second plane surface 10 so as to be secured to the second part 5b. This lug 26 also passes through an orifice 28 arranged in the friction disk 17 as shown in FIGS. 4 and 5, thereby constraining said friction disk 17 in rotation about the pivot axis X1 relative to the second plane surface 10. In addition, when the bicycle 1 is in the unfolded position, i.e. when the front portion 4 of the frame 2 is disposed in forward alignment with the rear portion 3 of said frame 2, said lug 26 is configured to constitute an abutment against the edge 12a of the circular groove 12, shown in FIG. 5, if the front portion 4 pivots in the wrong direction, i.e. in the direction opposite from the folding direction, relative to the rear portion 3. This offers the advantage of preventing any pivoting of the front portion 4 relative to the rear portion 3 about the pivot axis X1 in the direction opposite from the folding direction in which the bicycle 1 is folded, beyond a certain limit. When the bicycle 1 is in the unfolded position, i.e. when the head 14a of the stud 14 is inserted in the first orifice 15 in the second plane surface 10, the spring 24 is subjected to a traction force. Conversely, when the bicycle 1 is in the folded position, i.e. when the head 14a of the stud is disposed in the second orifice 16 in the second plane surface 10, said spring 24 is subjected to a compression force. When the stud 14 is retracted below the first plane surface when action is taken on the cable 20, this offers the advantage of causing the front portion 4 to pivot automatically relative to the rear portion 3 about the pivot axis X1 due to the fact that the spring 24 is subjected either to a traction force or to a compression force, said pivoting of the front portion 4 relative to the rear portion 3 taking place until the spring 24 reaches a rest position. This offers the advantage of preventing the head 14a of the stud 14 from being automatically repositioned in one or the other of said orifices 15, 16 in the second plane surface 10, when action ceases to be taken on the cable 20. Thus, the user actuates the operating handle 22, thereby making it possible to unlock the hinge system. When the user lets go of the operating handle 22, the hinge system remains in the unlocked position, because the head 14a of the stud 14 is out of alignment relative to the orifices 15, 16 in the second plane surface 10 and because the front portion 4 is inclined relative to the rear portion 3, thereby then enabling the user to manipulate the front portion 4 and the rear portion 3 with two hands, so as to cause said portions to pivot relative to each other.

It can be seen in FIGS. 1 and 2 that the first plane surface 9 and the second plane surface 10, which are in indirect contact with each other due to the presence of the friction disk 17, are disposed in a plane that is inclined slightly towards the rear and towards the left of the bicycle 1 relative to a horizontal plane, i.e. the pivot axis X1 is inclined slightly towards the rear and towards the left side of the bicycle 1 relative to a vertical axis. When the bicycle 1 is in the unfolded position and when the operating handle 22 is actuated, this offers the advantage of facilitating the natural pivoting of the front portion 4 towards the rear so as to press it against the rear portion 3 of the frame 2. This inclined plane also makes it possible to dispose the axis of rotation X3 of the front wheel 7 in alignment with the axis of rotation X4 of the rear wheel 6, as shown, in particular, in FIG. 2.

It can be seen, in particular with reference to FIG. 3, that the pivot coupling 29 of pivot axis X1 arranged between the first part 5a on the front portion 4 and the second part 5b on the rear portion 3 of the frame 2 makes it possible to constitute a duct 30 for passing cables 31, e.g. gear cables, brake cables, lighting cables, or other cables. Said duct 30 opens out in the rear portion 3 and in the front portion 4.

This pivot coupling 29 is implemented by means of a tubular segment 32 that is mounted in tight-fitting manner in a bore 33 shown in FIG. 6 that is arranged in the first part 5a, which tubular segment 32 extends above the first plane surface 9, as shown in FIGS. 3, 4, and 5. Said tubular portion 32 is inserted into a bore 34 arranged in the second part 5b as shown in FIGS. 3 to 5, and is mounted to pivot directly inside the bore 34. However, it is possible to use an antifriction or rolling bearing disposed between said tubular segment 32 and said bore 34, in particular with a view to limiting wear between these two parts.

It can also be seen that a clamping collar 35 is present that comes into abutment against the edge 4a of the second part 5b and is mounted in tight-fitting manner on the top end 32a of the tubular segment 32, as shown in FIG. 3. This clamping collar 35 secures the pivot coupling and prevents the front portion 4 from sliding relative to the rear portion 3. In addition, this top end 32a of the tubular portion 32 is tapped, as shown in FIG. 3, and it receives, in screw-fastening manner, a threaded part 36 provided with a head 36a configured to come into abutment against the clamping collar 35. This threaded part compresses the entire assembly so as to take up any assembly clearance. This makes it possible to prevent the second part 5b from sliding relative to the first part 5a along the pivot axis X1, and thus to implement said pivot coupling 29.

Other characteristics are possible without going beyond the ambit of the present invention. In particular, a cover can be provided that clips over the top portion 4b of the second part 5b so as to conceal the inside of the hinge system 5.

It is also possible to invert the design for the hinge system 5 implemented between the rear portion 4 and the front portion 3 of the frame 2.

What is claimed is:

1. A foldable bicycle comprising a frame made up of a rear portion supporting a rear wheel about a rear axis of rotation, of a front portion supporting a front wheel about a front axis of rotation, and of a hinge system arranged between the rear portion and the front portion so as to position the bicycle either in an unfolded position in which the front portion extends forwards and in alignment with the rear portion, or in a folded position in which the front portion is folded back against the rear portion, wherein the hinge system comprises a first part arranged on the rear portion and provided with a first plane surface, a second part arranged on the front portion and provided with a second plane surface that is in abutment in direct or indirect manner against the first plane surface, a pivot coupling arranged between the first part and the second part about a pivot axis that extends perpendicularly to said first and second plane surfaces, at least one stud, slide means arranged between the stud and one of the first and second parts so as to slide the stud either into a projecting position in which it projects from the first or the second plane surface or into a refracted position in which it is retracted inside said first or second parts, actuator means for actuating said at least one stud, which means are configured to slide said stud either into the projecting position or into the retracted position, and at least one orifice configured on the other of the first and second parts to open out in the first or the second plane surface and to receive said at least one stud in its projecting position at least when the bicycle is in its unfolded position, wherein the first part is provided with at least one bore opening out in the first plane surface and extending along an axis that is substantially parallel to the pivot axis, which bore slidably receives a stud, a spring being arranged inside the bore and being configured to exert thrust on the stud and to slide said stud into its projecting position, a traction system being configured to pull on the stud and to slide said stud into its refracted position.

2. A foldable bicycle according to claim 1, the traction system comprising a traction cable and an operating handle making it possible to actuate the traction cable so as to pull the stud into the retracted position.

3. A foldable bicycle according to claim 2, further comprising a saddle, the operating handle being offset under the saddle.

4. A foldable bicycle according to claim 1, a friction disk being arranged between the first plane surface and the second plane surface, the friction disk being secured to the plane surface in which said at least one orifice opens out, the friction disk being provided with as many orifices as said plane surface has, and with the orifices in the disk being arranged identically to the orifices in said plane surface, so as to enable said at least one stud to pass through when in its projecting position.

5. A foldable bicycle according to claim 1, wherein the pivot coupling is configured to constitute a duct that extends along the pivot axis and both through the first part and also through the second part, said duct being configured to pass cables.

6. A foldable bicycle according to claim 5, wherein the pivot coupling is constituted at least by one tubular segment that is arranged on the first part and that extends perpendicularly upwards relative to the first plane surface, by a bore arranged in the second part perpendicularly to the second plane surface for the purpose of receiving the tubular segment, and by stop means arranged between the tubular segment and the second part for the purpose of preventing the bore from moving in translation along the pivot axis relative to the tubular segment.

7. A foldable bicycle according to claim 1, wherein the stud has a conical head and the at least one orifice includes a conical bore segment configured to receive the conical head.

8. A foldable bicycle comprising a frame made up of a rear portion supporting a rear wheel about a rear axis of rotation, of a front portion supporting a front wheel about a front axis of rotation, and of a hinge system arranged between the rear portion and the front portion so as to position the bicycle either in an unfolded position in which the front portion extends forwards and in alignment with the rear portion, or in a folded position in which the front portion is folded back against the rear portion, wherein the hinge system comprises a first part arranged on the rear portion and provided with a first plane surface, a second part arranged on the front portion and provided with a second plane surface that is in abutment in direct or indirect manner against the first plane surface, a pivot coupling arranged between the first part and the second part about a pivot axis that extends perpendicularly to said first and second plane surfaces, at least one stud, slide means arranged between the stud and one of the first and second parts so as to slide the stud either into a projecting position in which it projects from the first or the second plane surface or into a refracted position in which it is retracted inside said first or second parts, actuator means for actuating said at least one stud, which means are configured to slide said stud either into the projecting position or into the retracted position, and at least one orifice configured on the other of the first and second parts to open out in the first or the second plane surface and to receive said at least one stud in its projecting position at least when the bicycle is in its unfolded position, wherein the second part is provided with two orifices opening out in the second plane surface for the purpose of receiving a stud in the projecting position, the first orifice being configured to receive the stud when the bicycle is in the unfolded position, and the second orifice being configured to receive said stud when the bicycle is in the folded position.

9. A foldable bicycle according to claim 8, a friction disk being arranged between the first plane surface and the second plane surface, the friction disk being secured to the plane surface in which said at least one orifice opens out, the friction disk being provided with as many orifices as said plane surface has, and with the orifices in the disk being arranged identically to the orifices in said plane surface, so as to enable said at least one stud to pass through when in its projecting position.

10. A foldable bicycle according to claim 8, wherein the pivot coupling is configured to constitute a duct that extends along the pivot axis and both through the first part and also through the second part, said duct being configured to pass cables.

11. A foldable bicycle according to claim 10, wherein the pivot coupling is constituted at least by one tubular segment that is arranged on the first part and that extends perpendicularly upwards relative to the first plane surface, by a bore arranged in the second part perpendicularly to the second plane surface for the purpose of receiving the tubular segment, and by stop means arranged between the tubular segment and the second part for the purpose of preventing the bore from moving in translation along the pivot axis relative to the tubular segment.

12. A foldable bicycle according to claim 8, wherein the stud has a conical head and the at least one orifice includes a conical bore segment configured to receive the conical head.

13. A foldable bicycle comprising a frame made up of a rear portion supporting a rear wheel about a rear axis of rotation, of a front portion supporting a front wheel about a front axis of rotation, and of a hinge system arranged between the rear portion and the front portion so as to position the bicycle either in an unfolded position in which the front portion extends forwards and in alignment with the rear portion, or in a folded position in which the front portion is folded back against the rear portion, wherein the hinge system comprises a first part arranged on the rear portion and provided with a first plane surface, a second part arranged on the front portion and provided with a second plane surface that is in abutment in direct or indirect manner against the first plane surface, a pivot coupling arranged between the first part and the second part about a pivot axis that extends perpendicularly to said first and second plane surfaces, at least one stud, slide means arranged between the stud and one of the first and second parts so as to slide the stud either into a projecting position in which it projects from the first or the second plane surface or into a refracted position in which it is retracted inside said first or second parts, actuator means for actuating said at least one stud, which means are configured to slide said stud either into the projecting position or into the retracted position, and at least one orifice configured on the other of the first and second parts to open out in the first or the second plane surface and to receive said at least one stud in its projecting position at least when the bicycle is in its unfolded position, wherein, in its first plane surface, the first part is provided with a circular groove in which a spring is arranged that has a first end secured to said first part and a second end secured to the second part, said spring being configured to cause the front portion to pivot automatically relative to the rear portion so as to bring the at least one stud out of alignment with the at least one orifice when said stud is in the retracted position.

14. A foldable bicycle according to claim 13, further comprising a lug that extends downwards relative to the second plane surface and that is disposed in the circular groove, said lug being configured to come into abutment against an edge of the circular groove so as to prevent the front portion from pivoting relative to the rear portion in the direction opposite from the folding direction in which said bicycle is folded.

15. A foldable bicycle according to claim 13, the second end of the spring being secured to the lug.

16. A foldable bicycle according to claim 13, a friction disk being arranged between the first plane surface and the second plane surface, the friction disk being secured to the plane surface in which said at least one orifice opens out, the friction disk being provided with as many orifices as said plane surface has, and with the orifices in the disk being arranged identically to the orifices in said plane surface, so as to enable said at least one stud to pass through when in its projecting position.

17. A foldable bicycle according to claim 13, wherein the pivot coupling is configured to constitute a duct that extends along the pivot axis and both through the first part and also through the second part, said duct being configured to pass cables.

18. A foldable bicycle according to claim 17, wherein the pivot coupling is constituted at least by one tubular segment that is arranged on the first part and that extends perpendicularly upwards relative to the first plane surface, by a bore arranged in the second part perpendicularly to the second plane surface for the purpose of receiving the tubular segment, and by stop means arranged between the tubular segment and the second part for the purpose of preventing the bore from moving in translation along the pivot axis relative to the tubular segment.

19. A foldable bicycle according to claim 13, wherein the stud has a conical head and the at least one orifice includes a conical bore segment configured to receive the conical head.

* * * * *